United States Patent [19]

Hirai et al.

[11] 4,367,307

[45] Jan. 4, 1983

[54] POLYURETHANE COMPOSITION HAVING GOOD LIGHT RESISTANCE

[75] Inventors: Koji Hirai; Kenji Shirano; Kazuo Hara, all of Kurashiki; Takayuki Okamura, Okayama, all of Japan

[73] Assignee: Kuraray Company, Limited, Kurashiki, Japan

[21] Appl. No.: 250,554

[22] Filed: Apr. 3, 1981

[30] Foreign Application Priority Data

Apr. 15, 1980 [JP] Japan ................................ 55-50697

[51] Int. Cl.$^3$ ............................................. C08L 75/08
[52] U.S. Cl. ........................................ 524/590; 8/515
[58] Field of Search ...................... 260/37 N; 528/61; 524/590; 8/515

[56] References Cited

U.S. PATENT DOCUMENTS

| | | | |
|---|---|---|---|
| 3,900,688 | 8/1975 | Thoma et al. | 428/246 |
| 3,904,796 | 9/1975 | Zorn et al. | 528/61 |
| 3,912,680 | 10/1975 | Oertel et al. | 528/61 |

Primary Examiner—Lewis T. Jacobs
Attorney, Agent, or Firm—Oblon, Fisher, Spivak, McClelland & Maier

[57] ABSTRACT

A polyurethane composition comprising a polyurethane and at least one dye selected from the group consisting of metal complex dyes, vat dyes, sulfur dyes and acid dyes. The polyurethane is synthesized by the reaction of a polymeric diol containing a polyoxyethylene chain as a minor proportion, an alicyclic diisocyanate, an alicyclic diamine and hydrazine in particular proportions. This polyurethane composition is little susceptible to deterioration by light and is suitable for use as a component of artificial leather or as a coating material for fabrics.

7 Claims, No Drawings

POLYURETHANE COMPOSITION HAVING GOOD LIGHT RESISTANCE

BACKGROUND OF THE INVENTION

1. Field of the Invention

This invention relates to a polyurethane composition less susceptible to deterioration by light. More particularly, it relates to a polyurethane composition which comprises a polyurethane obtained by reacting a polymeric diol containing polyoxyethylene chain, an organic alicyclic diisocyanate, an organic alicyclic diamine and hydrazine in a particular proportion and a particular dye. The polyurethane composition has an extremely good light resistance and is particularly useful as a component of artificial leather or as a coating material for fabric.

2. Description of the Prior Art

Polyurethanes have been used in a wide variety of fields, for example, as various foams ranging from cushion materials to structural materials, various molded articles, elastic fibers, coating materials, adhesives, artificial leathers and the like, because of their superior properties with respect to chemical resistance, abrasion resistance, resistance to cold weather, durability and the like, the development and advance of various processing techniques therefor and their unique elastic nature which covers a middle region between rubbers and plastics. Though polyurethanes have many advantages as above, they are inferior in light resistance and specifically have a disadvantage in that they are degraded when exposed to light, resulting in a decrease in tenacity and elongation. Particularly when a polyurethane is used as a surface coating material for fabric or as a component of artificial leather, its light resistance is of great importance.

Various attempts have heretofore been proposed to improve the light resistance of polyurethanes that is the most serious problem involved therein. Polyurethanes are formed by the reaction of a polyester, polyether or polycarbonate-type polymeric diol with an organic diisocyanate and an active hydrogen compound as a chain extender. It is well known that, when the organic diisocyanate used is an organic aromatic diisocyanate or the active hydrogen compound is an organic aromatic diamine, for example, the resulting polyurethane is susceptible to deterioration by light. Light resistance of polyurethanes can be improved by using an aliphatic or alicyclic organic diisocyanate and diamine in place of aromatic organic diisocyanate and diamine, respectively. Also it is known that the use of hydrazine as a chain extender provides a polyurethane having an improved light resistance.

On the basis of the above-mentioned knowledge, it is disclosed in German Pat. No. 2,252,280 (corresponding to U.S. Pat. No. 3,900,688 and British Pat. No. 1,418,550) that a polyurethane having an excellent light resistance can be synthesized by using a polycarbonate glycol as a polymeric diol, an aliphatic or alicyclic organic diisocyanate as an organic diisocyanate and a combination of an aliphatic or alicyclic organic diamine and hydrazine as a chain extender. However, the polyurethanes described in this patent are not adequately satisfactory with respect to light resistance.

SUMMARY OF THE INVENTION

A first object of this invention is to provide a polyurethane composition having good light resistance. A second object is to provide a polyurethane composition wherein the dye incorporated therein does not migrate out of the polyurethane or is not decomposed by laundering, by action of light, heat or the like or even simply with elapse of time. A third object of the invention is to provide a polyurethane composition which possesses these properties and in addition is adequately satisfactory in other properties such as tenacity and elongation, flexing resistance, heat resistance and water resistance.

These and other objects can be accomplished by a polyurethane composition which comprises a polyurethane obtained by reacting a polymeric diol containing polyoxyethylene chain, an organic alicyclic diisocyanate, an organic alicyclic diamine and hydrazine at a particular proportion and a particular dye combined with the polyurethane.

Thus, this invention relates to a polyurethane composition which comprises a polyurethane formed from (a) a polymeric diol having an average molecular weight in the range of 300 to 5,000, (b) an organic alicyclic diisocyanate, (c) hydrazine and (d) an organic alicyclic diamine and at least one dye selected from the group consisting of metal complex dyes, vat dyes, sulfur dyes and acid dyes, wherein said polyurethane satisfies the following requirements:

(I) the polymeric diol is either a diol containing a $+CH_2CH_2O+_n$ chain in its molecule or a mixture thereof with a polymeric diol free from $-CH_2CH_2O)_n$ chain where n is between 12 and 100 on the average and the amount of $+CH_2CH_2O)_n$ in the polymeric diol is in the range of 5 to 50% by weight;

(II) the molar ratio of organic diisocyanate to polymeric diol is in the range of 2.2 to 5.0; and (III) the molar ratio of hydrazine to the total amount of hydrazine and the organic alicyclic diamine is in the range of 0.05 to 0.8.

DETAILED DESCRIPTION OF THE INVENTION

As mentioned above, the polymeric diol which is a component of the starting materials used for the synthesis of the polyurethane of which the polyurethane composition of this invention is comprised is either a diol which contains a $+CH_2CH_2O)_n$ chain in its molecule or a mixture thereof with a polymeric diol not containing such chain where n is on the average between 12 and 100 and the amount of $+CH_2CH_2O)_n$ in the polymeric diol is in the range of 5 to 50% by weight.

In the practice of this invention, it is preferred from the availability of materials to use poly(ethylene ether) glycol having an average degree of polymerization in the range of 12 to 100 in combination with at least one diol selected from the group consisting of conventional polymeric diols including polyester glycols such as polyethylene adipate glycol, polypropylene adipate glycol, polytetramethylene adipate glycol, polyhexamethylene adipate glycol, polyethylenepropylene adipate glycol, polycaprolactone glycol, etc.; polyether glycols such as poly(propylene ether) glycol, poly(tetramethylene ether) glycol, etc. [excepting poly(ethylene ether) glycol]; polycarbonate glycols representated by 1,6-hexanediol polycarbonate glycol; polyacetal glycols; polybutadiene glycols, and the like. In addition, a block copolymeric diol having polyoxyethylene chain in its molecule may be used. Such copolymeric diols include poly(oxypropylene)poly(oxyethylene) glycol, poly(oxyethylene)polycaprolactone block copolymer and the like. These copolymeric diols may be used singly or as a combination with any of various polymeric diols as mentioned above. The combined use of a polyester glycol and poly(ethylene ether) glycol or of a polycarbonate glycol and poly(ethylene ether) glycol as polymeric diol is particularly preferred, because not only the starting materials are readily available, but the resulting polyurethane composition is superior in light resistance and light fastness of the dye incorporated therein.

In accordance with this invention, the polymeric diol which is exemplified as above must have an average molecular weight in the range of 300–5,000, preferably in the range of 500–4,000. If the average molecular weight of the polymeric diol is less than 300, the resulting polyurethane composition will be too hard to possess the elasticity required for polyurethanes and it will have an extremely decreased elongation at break. On the other hand, a polymeric diol having an average molecular weight exceeding 5,000 will provide a too soft polyurethane composition the elasticity of which is lost and the strength of which is extremely decreased.

In the polyurethane composition of this invention, the number of repeating units of the polyoxyethylene chain present in the polymeric diol, i.e., the n value in the formula $-(CH_2CH_2O)_n$ by which the polyoxyethylene chain is represented, is significantly critical. If n is less than 12 on the average, the resulting polyurethane polymer will possess little affinity for dye molecules. Therefore, when such polyurethane is blended with a dye, the dye molecules will migrate out of the polyurethane with elapse of time or by treatment such as dry-cleaning, laundering, etc., and hence it is impossible to obtain a polyurethane composition having good light resistance for a prolonged period of time. If n exceeds 100 on the average, the resulting polyurethane composition will be so soft that it has a decreased strength and elongation as well as a poor resistance to light and water. In the present invention, the objects thereof are accomplished better when the average value of n is between 15 and 80.

Also in the polyurethane composition of this invention, the amount of polyoxyethylene chain in the polymeric diol must be in the range of 5 to 50% by weight. If this amount is less than 5% by weight, the resulting polyurethane polymer will have a low affinity for dye molecules. Therefore, when such polymer is blended with a dye, the dye molecules will migrate out of the polyurethane with elapse of time or by treatment such as dry-cleaning, laundering, etc. and the light resistance cannot be sustained over a prolonged period. On the other hand, in an amount of polyoxyethylene chain exceeding 50% by weight, the polyurethane molecules in the resulting polyurethane composition will be susceptible to degradation by light and thermal oxidation which lead to a decrease in strength and elongation, and in addition the polyurethane will readily be swollen in water, resulting in a significantly decreased wet strength and a poor fastness to laundering. Particularly when the polyurethane composition is used to coat the surface of a textile product therewith, it is anticipated that the coated textile product will be got wet with water or subjected to laundering because it is generally used as a coating (coat cloth) or a substitute for natural leather, and hence it is highly critical that it does not show a decrease in strength when it is wet.

The term "polycarbonate glycol" used herein is a generic name for those polymeric diols which have an intermediate group of the formula:

$$-(R-OCO)_p-$$
$$\phantom{-(R-O}\|\phantom{O)_p}$$
$$\phantom{-(R-OC}O\phantom{)_p}$$

and a terminal hydroxyl group at each end, wherein R is a divalent organic radical and p represents the degree of polymerization. In the present invention, the most preferred polycarbonate glycol is 1,6-hexanediol polycarbonate (R=hexamethylene).

In accordance with this invention, the isocyanate component used is an organic alicyclic diisocyanate, representative of which are 3-isocyanatemethyl-3,5,5-trimethylcyclohexylisocyanate (conventionally referred to as "isophorone diisocyanate"), dicyclohexylmethane-4,4'-diisocyanate, 4,4'-isopropylidenedicyclohexane diisocyanate, etc.

If the organic alicyclic diisocyanate is replaced by an organic aliphatic or aromatic one, the resulting polyurethane will be inferior not only in light resistance, but in mechanical properties, heat resistance and water resistance. Particularly the use of an aromatic diisocyanate provides a polyurethane having a very poor light resistance.

As mentioned above, it is an essential feature of this invention to use an organic alicyclic diisocyanate as the diisocyanate component, but all the diisocyanate component need not be alicyclic. In other words, a small portion of the diisocyanate component may be replaced by an organic aliphatic or aromatic diisocyanate. However, the more the amount of such aliphatic or aromatic diisocyanate is, the above-mentioned disadvantages inherent therein become more serious. For this reason, it is preferred in the practice of this invention to use none of organic diisocyanates, particularly aromatic diisocyanates, other than organic alicyclic diisocyanates.

In accordance with the present invention, the molar ratio of organic diisocyanate to polymeric diol should be in the range of 2.2 to 5.0. The synthesis of polyurethanes is generally conducted under conditions wherein the molar ratio of organic diisocyanate to polymeric diol is considerably lower than 2.2 and thus it is a feature of this invention to employ a relatively higher molar ratio of diisocyanate to polymeric diol as compared with that conventionally employed in the prior art. In the polyurethane composition of this invention, if the molar ratio of organic diisocyanate to polymeric diol is lower than 2.2, it will have a decreased light resistance and a poor heat resistance. On the other hand, a molar ratio exceeding 5.0 will provide a polyurethane composition which is relatively hard and possesses a decreased elongation. Preferred range of the molar ratio is from 2.5 to 4.5. The organic diisocyanate referred to herein with respect to the molar ratio encompasses all the organic diisocyanate(s) used. Thus, when a small portion of the organic alicyclic diisocyanate is replaced by an organic aliphatic or aromatic diisocyanate, the amount of diisocyanate indicates the sum of the amounts of the alicyclic diisocyanate and the aliphatic or aromatic diisocyanate.

Also according to the present invention, the chain extender used must be a combination of an organic alicyclic diamine and hydrazine. Representative of the organic alicyclic diamine used in this invention are 1-amino-3-aminomethyl-3,5,5-trimethylcyclohexane (conventionally referred to as "isophoronediamine"), 4,4'-diaminodicyclohexylmethane, 4,4'-diamino-3,3'- dimethylcyclohexylmethane, cyclohexylenediamine and the like.

If the organic alicyclic diamine is replaced by an aliphatic or aromatic one, the resulting polyurethane will be inferior in mechanical properties, heat resistance and water resistance, or in light resistance. Particularly the use of an aromatic diamine will provide a polyurethane having a very poor light resistance.

Although it is an essential feature of this invention, as mentioned above, to use an organic alicyclic diamine as the organic diamine compound, all the diamine need not be alicyclic. Thus, a small portion thereof may be replaced by an aliphatic or aromatic organic active hydrogen compound. However, the more the amount of such aliphatic or aromatic active hydrogen compound is, the above-mentioned disadvantages inherent therein become more serious. For this reason, it is preferred in the practice of this invention to use none of organic active hydrogen compounds, particularly organic aromatic diamines, other than organic alicyclic diamines.

The term "organic active hydrogen compounds" used herein means those low molecular weight organic compounds having two hydroxyl or amino groups, which are conventionally used as chain extenders for polyurethanes. The terms "organic alicyclic diisocyanate" and "organic alicyclic diamine" are intended to include not only those compounds having an isocyanato or amino groups directly attached to the aliphatic ring (e.g., cyclohexane ring), but those compounds having an isocyanato or amino group attached to the aliphatic ring through an alkylene group.

As stated above, it is essential in the present invention to use an organic alicyclic diisocyanate and diamine as the organic diisocyanate and diamine, respectively. In this connection, it is particularly preferred in view of easiness in the synthesis of polyurethane and the storage and use of the synthesized polyurethane solution to use either isophorone diisocyanate as the organic alicyclic diisocyanate or isophoronediamine as the organic alicyclic diamine, or both (that is, to use an isophorone compound for at least one of the organic alicyclic diisocyanate and diamine). The reason is that the isophorone-type diisocyanate and diamine can considerably retard the thickening and gelation of a polyurethane solution during synthesis of the polyurethane or storage of the resulting polyurethane solution, such thickening and gelation being generally encountered in systems containing hydrazine the use of which as a part of the chain extender is essential in the present invention.

The amount of hydrazine used as a component of the chain extender according to this invention should be in the range of 5 to 80 mol% based on the sum of the amounts of the alicyclic diamine and hydrazine. If the amount of hydrazine is less than 5 mol%, a composition comprising the resulting polyurethane blended with a dye has a poor light resistance. On the other hand, if the amount of hydrazine is more 80%, a polyurethane composition comprising the resulting polyurethane blended with a dye will possess an insufficient fastness of the dye to laundering and also a poor water resistance so that the polyurethane composition is not suitable for use as a surface coating layer of fabric or as a component of artificial leather. Such a larger amount of hydrazine is also disadvantageous in that it causes gelation during synthesis of the polyurethane and thickening of the polyurethane solution after the synthesis. The hydrazine used in the present invention may be in the form of its hydrate.

As stated above, the polyurethane of which the polyurethane composition is comprised is synthesized from a polymeric diol as mentioned above, an organic alicyclic diisocyanate, an organic alicyclic diamine and hydrazine, and the synthesis of such polyurethane can be effected by any known method conventionally employed in the art of synthesis of polyurethanes. Representative methods are described in the following.

The polymeric diol and the organic alicyclic diisocyanate are reacted in such proportion that the isocyanate groups are in excess of the terminal hydroxyl groups of the polymeric diol by heating the reactants at 50°–130° C. under nitrogen atmosphere to give a polyurethane prepolymer having terminal isocyanate groups. The resulting prepolymer is dissolved in a solvent and then reacted with hydrazine and the organic alicyclic diamine around ambient temperature to chain-extend the prepolymer and thereby give a polyurethane solution. If necessary, a carboxylic acid or similar compound is added to the resulting polyurethane solution to block the unreacted amino groups present therein and thereby stabilize the polyurethane solution. The solvents useful in the synthesis of polyurethanes include, for example, dimethylformamide, diethylformamide, dimethylacetamide, dimethyl sulfoxide, acetone, methyl ethyl ketone, toluene, isopropanol, cyclohexane, tetrahydrofuran, ethyl acetate, methylcellosolve, cellosolve acetate and the like. Among these solvents, some cannot serve as a solvent by themselves, and such solvents are usable only when they are combined with another solvent.

The polyurethane according to the present invention has a tendency to cause gelation or thickening of its solution when it is synthesized or stored in solution. In order to retard such gelation or thickening, as stated above, it is effective to use isophorone diisocyanate and/or isophoronediamine as starting materials, and it is also effective to use a lower alcohol such as methanol, ethanol or the like or water as a part of the reaction solvent or add it to the polyurethane solution after the reaction.

In order to provide the resulting polyurethane with better affinity for dyes, a tertiary nitrogen-containing compound, e.g., N-methylaminobispropylamine, N-methyldiethanolamine, N-isobutyldiethanolamine, 1,4-bisaminopropylpiperazine or the like may be used as a part of the chain extender. However, since various properties including resistance to hydrolysis and light resistance become poorer with increasing amount of the tertiary nitrogen-containing compound, it is preferred that the amount of tertiary nitrogen-containing compound be not greater than about 15 mol% based on the total amount of the chain extender.

The polyurethane compositions of this invention are obtained by blending a dye with a polyurethane prepared as above. Among a wide variety of dyes, those capable of significantly improving the light resistance of the polyurethanes according to this invention are restricted to metal complex dyes, vat dyes, sulfur dyes, and acid dyes. Of these, metal complex dyes are particularly preferred. Other dyes such as direct dyes, disperse dyes and basic dyes also improve the light resistance of the polyurethanes to a certain degree. However, with these dyes, the degree of improvement of light resistance is only slight, and the dye retention, for example, fastness of dye to laundering and dry-cleaning and the prevention of dye migration are insufficient.

The metal complex dyes are a class of dyes in which a metal atom and a dye molecule form a complex salt at a ratio of 1:1 or 1:2. These dyes usually contain a sulfonamide or akylsulfone group or other groups in their molecules and, as a whole, carry a negative charge. Chromium is the most common metal that forms such complexes, but other metals such as cobalt and copper may be used. Particularly suitable for use in the present invention are 1:2-type metal complex dyes. Vat dyes and sulfur dyes are both a class of dyes that can be water-solubilized by reduction in the presence of an alkali and then made water-insoluble by oxidation treatment. Acid dyes are a class of dyes that contain an acid group such as hydroxyl (—OH), carboxyl (—COOH) or sulfonic (—SO$_3$H) group and are used in an aqueous sulfuric acid bath. The aforementioned 1:1-type metal complex dyes falls within this class of dyes, but 1:2-type metal complex dyes may not fall within the acid dyes since a neutral bath is frequently used in dyeing with this type of dyes.

In the compositions of this invention, the dye is preferably blended in an amount of at least 3% by weight based on the weight of polyurethane. In an amount of less than 3% by weight, the effect attributable to incorporation of the dye, i.e., improvement of light resistance, cannot be developed adequately. It is generally preferred that the amount of dye blended be not greater than 70% by weight based on the weight of polyurethane. If this amount exceeds 70% by weight, not only the mechanical properties such as strength and elongation of the polyurethane composition are decreased, but no further improvement of light resistance does not found. The particular one or more dyes to be blended may be selected from metal complex dyes, vat dyes, sulfur dyes and acid dyes depending on the color required, the amount of dyes to be blended and the purpose of the composition.

The polyurethane composition of this invention can be prepared either by adding at least one dye selected from the group of metal complex dyes, vat dyes, sulfur dyes and acid dyes to a polyurethane solution prepared as above and then removing the solvent from the polyurethane solution, or by dyeing a solid polyurethane (usually in the form of film or coating layer) obtained by removing the solvent from a polyurethane solution with at least one dye as described above to penetrate the dye molecules into the polyurethane. Either of the two methods is selected depending on the particular dye used, the amount thereof and the purpose of the polyurethane composition.

The polyurethane composition of this invention may further contain one or more of various additives, for example, antioxidants, UV absorbers, pigments, dyes, flame retardants, fillers and the like.

The polyurethane compositions of this invention are particularly suitable for use as a component of artificial leather or a surface coating layer of fabrics. Artificial leather which comprises a polyurethane composition of this invention can be prepared, for example, as follows.

A fibrous web representative of which are nonwoven fabric, woven fabric, knitted fabric and a laminate thereof is impregnated with the polyurethane solution, then subjected to wet coagulation or dry cogulation to remove the organic solvent and dried to give an impregnated sheet. If the polyurethane impregnating solution contains no dye, the impregnated sheet is then dyed. Finally the surface of the impregnated sheet is buffed to provide a suede-like artificial leather sheet. In another method, a grained artificial leather sheet can be obtained by impregnating a fibrous web with a polymeric elastomer, then coagulating the polymeric elastomer if necessary, coating the impregnated sheet with the polyurethane solution, wet-coagulating the polyurethane to provide a surface coating layer, and dyeing if the polyurethane solution contains no dye. Alternatively a grained artificial leather sheet can also be manufactured by preforming a film of the polyurethane from its solution by a wet or dry process and laminating the film onto the surface of a fibrous web impregnated or not impregnated with a polymeric elastomer, or by directly coating a fibrous web with the polyurethane solution, then dry- or wet-coagulating the polyurethane, and dyeing if the polyurethane solution contains no dye.

The textile products having a polyurethane composition of this invention laid on the surface or distributed therein are significantly excellent in light resistance, and are suitable for use as garments, shoes, bags and upholstery fabrics and in other many fields.

This invention is further illustrated by the following examples. In the examples, the data of hydrothermal test were obtained by immersion in hot water at 90° C. for 10 days and those of fade-Ometer test were obtained by exposure to a carbon arc lamp in an atmosphere at 63° C. for 500 hours, unless otherwise indicated. The dye fading (fastness to light) of the dyed samples was measured according to the method of JIS L 0842-1971, the fastness to dry cleaning, according to the method of JIS L 0860 and the fastness to laundering, according to the method of JIS L 0844-1973 (Method A). These fastness properties were evaluated in five grades using a grey scale for discoloration and fading and that for soiling, wherein the fastness decreases with decreasing grade from Grade 5 which indicates a very high fastness to Grade 1 which indicates that the fastness is very poor. The measurement of dye migration was conducted as follows. A white polyurethane sheet was laid on a test sample of the same size and the laminate was sandwiched between glass plates (each having a size of 10 cm × 10 cm and a thickness of 3 mm). The sandwich was placed in an oven at 70° C. under a load of 71 kg for 24 hours to intimately contact the polyurethane sheet with the sample and thereafter the degree of migration of dye from the sample to the white polyurethane sheet was evaluated in five grades (Grades 1 to 5) using a color scale for soiling. Regarding the viscosity stability, to mark "O" indicates the case where thickening or increase in viscosity was little observed and the mark "X" indicates the case where a considerable thickening occurred. In the examples, all the starting materials used for the synthesis of polyurethanes are expressed by the following abbreviations.

| Abbreviation | Compound |
|---|---|
| PCL | Polycaprolactone glycol |
| PTG | Polytetramethylene ether glycol |
| PC | 1,6-Hexanediol polycarbonate |
| PEG | Polyethylene ether glycol |
| MDI | Diphenylmethane-4,4'-diisocyanate |
| HMDI | Hexamethylene diisocyanate |
| H$_{12}$MDI | Dicyclohexylmethane-4,4'-diisocyanate |
| IPDI | Isophorone diisocyanate |
| HMDA | Hexamethylenediamine |
| H$_{12}$DAM | 4,4'-Diaminodicyclohexylmethane |
| CDA | Cyclohexylenediamine |
| IPDA | Isophoronediamine |
| HH | Hydrazine hydrate |

EXAMPLES 1–4 AND COMPARATIVE EXAMPLES 1–5

Various polyurethane elastomers were prepared from polymeric diols, organic diisocyanates and chain extenders indicated in Table 1 below in the following manner. The polymeric diol and the organic diisocyanate were reacted with stirring at 60° to 120° C. for 5 to 10 hours under nitrogen atmosphere and the resulting polyurethane prepolymer was dissolved in dimethylformamide (hereinafter abbreviated as DMF) to give a solution having a concentration of 15% by weight. The chain extender was dissolved in DMF in the amount indicated in Table 1 and to the resulting solution was added the above prepolymer solution. The mixture was stirred at 30° C. for 2 to 5 hours under nitrogen to effect chain extending reaction and give a solution of polyurethane elastomer in DMF. After the polyurethane concentration of the solution was adjusted to 10% by weight, it was cast onto a glass plate and dried to give a dry film approximately 40μ thick. The film was dyed under the dyeing, soaping and rinsing conditions mentioned below. The dyed film was subjected to various physical tests for evaluating its properties. The results are reported in Table 2 below. In each example (except Comparative Example 3) the dyed film contained the dye in an amount of 200 to 250 mg per gram of the polyurethane, and the film of Comparative Example 3 had a dye content of 130 mg/g. In each example, the dye molecules were penetrated almost uniformly across the thickness of the film.

Dyeing conditions:
Dye: Irgalan Yellow GRL  30–50% owf
(1:2 type metal complex dye)
Bath ratio:  1:500
Dyeing temperature:  90° C.
Dyeing time:  2 hours
Soaping conditions:
Surfactant:  Monogen Uni (anionic)
Soaping temperature:  60° C.
Soaping time:  10 minutes
Rinsing conditions:
10 Minutes under running water

TABLE 1

| Example No. | Polymeric diol:Ave. M.W. (Molar ratio) | Organic diisocyanate (Molar ratio) | Chain extender (Molar ratio) |
|---|---|---|---|
| Example 1 | PCL:2000 (0.7) PEG:1500 (0.3) | IPDI (3.0) | IPDA (1.0) HH (1.0) |
| Comparative Example 1 | PCL:2000 (0.7) PEG:1500 (0.3) | IPDI (3.0) | IPDA (2.0) |
| Comparative Example 2 | PCL:2000 (0.7) PEG:1500 (0.3) | IPDI (3.0) | HH (2.0) |
| Comparative Example 3 | PCL:2000 (0.7) PEG:1500 (0.3) | MDI (3.0) | IPDA (1.0) HH (1.0) |
| Comparative Example 4 | PCL:2000 (0.7) PEG:1500 (0.3) | HMDI (3.0) | IPDA (1.0) HH (1.0) |
| Comparative Example 5 | PCL:2000 (0.7) PEG:1500 (0.3) | IPDI (3.0) | HMDA (2.0) |
| Example 2 | PCL:2000 (0.7) PEG:1500 (0.3) | IPDI (3.0) | $H_{12}$DAM (1.0) HH (1.0) |
| Example 3 | PCL:2000 (0.7) PEG:1500 (0.3) | $H_{12}$MDI (3.0) | IPDA (1.0) HH (1.0) |
| Example 4 | PCL:2000 (0.7) PEG:1500 (0.3) | $H_{12}$MDI (3.0) | CDA (1.0) HH (1.0) |

TABLE 2

| | Dyed dry film property | | | Fade-Ometer test | | | Property | Hydrothermal test | | |
|---|---|---|---|---|---|---|---|---|---|---|
| Example No. | Stress at 100% elongation (kg/cm²) | Tensile strength (kg/cm²) | Elongation (%) | Retention of tensile strength (%) | Retention of elongation (%) | Dye fading (grade) | Softening temp. (°C.) | Retention of tensile strength (%) | Retention of elongation (%) | Stability of solution |
| Example 1 | 59 | 650 | 580 | 100 | 102 | 5 | 160 | 75 | 90 | o |
| Comparative Example 1 | 65 | 670 | 560 | 56 | 80 | 2–3 | 160 | 76 | 92 | o |
| Comparative Example 2 | 50 | 620 | 590 | 98 | 100 | 5 | 135 | 18 | 41 | x |
| Comparative Example 3 | 60 | 700 | 530 | 0 | 0 | 1 | 170 | 61 | 81 | x |
| Comparative Example 4 | 46 | 580 | 580 | 90 | 92 | 4–5 | 130 | 72 | 88 | o |
| Comparative Example 5 | 49 | 590 | 570 | 90 | 90 | 2–3 | 135 | 70 | 85 | o |
| Example 2 | 63 | 680 | 580 | 102 | 105 | 5 | 162 | 76 | 91 | o |
| Example 3 | 65 | 700 | 570 | 102 | 100 | 5 | 165 | 73 | 90 | o |
| Example 4 | 60 | 630 | 580 | 96 | 98 | 5 | 160 | 70 | 91 | o |

EXAMPLES 5–8 AND COMPARATIVE EXAMPLES 6 & 7

Various polyurethane elastomers were prepared from the polymeric diols, organic diisocyanates and chain extenders indicated in Table 3 in the same way as described in Example 1, and dyed films thereof were made following the film forming and dyeing procedure described in Example 1 and subjected to various physical tests. The results are summarized in Table 4.

TABLE 3

| Example No. | Polymeric diol:Ave. M.W. (Molar ratio) | Organic diisocyanate (Molar ratio) | Chain extender (Molar ratio) |
|---|---|---|---|
| Comparative Example 6 | PCL:2000 (1.0) PEG:1500 (0) | IPDI (3.0) | IPDA (1.0) HH (1.0) |
| Example 5 | PCL:2000 (0.9) PEG:1500 (0.1) | IPDI (3.0) | IPDA (1.0) HH (1.0) |
| Example 6 | PCL:2000 (0.6) PEG:1500 (0.4) | IPDI (3.0) | IPDA (1.0) HH (1.0) |
| Comparative Example 7 | PCL:2000 (0.4) PEG:1500 (0.6) | IPDI (3.0) | IPDA (1.0) HH (1.0) |
| Example 7 | PTG:2000 (0.7) PEG:1500 (0.3) | IPDI (3.0) | IPDA (1.0) HH (1.0) |
| Example 8 | PC:2000 (0.7) PEG:1500 (0.3) | IPDI (3.0) | IPDA (1.0) HH (1.0) |

TABLE 4

| Example No. | Dye content of dry film (mg/g) | Dyed dry film property | | | Fade-Ometer test | | | Fastness to dry cleaning (grade) | Dye migration (grade) | Fastness to laundering (grade) |
|---|---|---|---|---|---|---|---|---|---|---|
| | | Stress at 100% elongation (kg/cm²) | Tensile strength (kg/cm²) | Elongation (%) | Retention of tensile strength (%) | Retention of elongation (%) | Dye fading (grade) | | | |
| Comparative Example 6 | 23 | 70 | 680 | 500 | 50 | 70 | 2 | 1–2 | 1 | 2–3 |
| Example 5 | 120 | 65 | 660 | 510 | 95 | 102 | 4–5 | 3 | 3 | 5 |
| Example 6 | 270 | 53 | 620 | 590 | 97 | 100 | 5 | 5 | 5 | 5 |
| Comparative Example 7 | 350 | 40 | 560 | 620 | 60 | 75 | 4–5 | 5 | 4 | 2–3 |
| Example 7 | 220 | 55 | 620 | 520 | 40 | 65 | 5 | 5 | 5 | 5 |
| Example 8 | 215 | 65 | 630 | 480 | 105 | 100 | 5 | 5 | 5 | 5 |

EXAMPLES 9 & 10 AND COMPARATIVE EXAMPLES 8 & 9

Following the procedure described in Example 1, various polyurethane elastomers were prepared from the polymeric diols, organic diisocyanates and chain extenders indicated in Table 5 and film forming and dyeing were conducted to give dyed films. The obtained films were subjected to various physical tests. The results are shown in Table 6. In each example, the dyed film contained the dye in an amount of 200 to 250 mg per gram of the polyurethane, and the dye molecules were penetrated almost uniformly across the thickness of the film.

TABLE 5

| Example No. | Polymeric diol:Ave. M.W. (Molar ratio) | Organic diisocyanate (Molar ratio) | Chain extender (Molar ratio) |
|---|---|---|---|
| Comparative Example 8 | PC:2000 (0.7) PEG:2000 (0.3) | H₁₂MDI (2.0) | IPDA (0.5) HH (0.5) |
| Example 9 | PC:2000 (0.7) PEG:2000 (0.3) | H₁₂MDI (3.0) | IPDA (1.0) HH (1.0) |
| Example 10 | PC:2000 (0.7) PEG:2000 (0.3) | H₁₂MDI (4.0) | IPDA (1.5) HH (1.5) |
| Comparative Example 9 | PC:2000 (0.7) PEG:2000 (0.3) | H₁₂MDI (5.2) | IPDA (2.1) HH (2.1) |

TABLE 6

| Example No. | Dyed dry film property | | | | Fade-Ometer test | | Hydro-thermal resistance* | Softening point (°C.) |
|---|---|---|---|---|---|---|---|---|
| | Young's modulus (kg/mm²) | Stress at 100% elongation (kg/cm²) | Tensile strength (kg/cm²) | Elongation (%) | Retention of strength (%) | Dye fading (grade) | | |
| Comparative Example 8 | 1.2 | 25 | 560 | 530 | 79 | 4 | Whitening | 130 |
| Example 9 | 5.5 | 85 | 650 | 430 | 100 | 5 | Clear | 165 |
| Example 10 | 20 | 105 | 680 | 410 | 105 | 5 | Clear | 170 |
| Comparative Example 9 | 39 | 158 | 550 | 300 | 102 | 5 | Clear | 170 |

*Resistance to treatment in hot water at 90° C. for 24 hours.

EXAMPLES 11–13 AND COMPARATIVE EXAMPLE 10

Various polyurethane elastomers were prepared from the polymeric diols, organic diisocyanates and chain extenders indicated in Table 7 in the same way as described in Example 1, and dyed films thereof were made by conducting film forming and dyeing procedure in the same way as in Example 1 and subjected to various physical tests. The results are reported in Table 8. In each dyed film, the dye molecules were penetrated almost uniformly across the thickness of the film.

TABLE 7

| Example No. | Polymeric diol:Ave. M.W. (Molar ratio) | Organic diisocyanate (Molar ratio) | Chain extender (Molar ratio) |
|---|---|---|---|
| Example 11 | PCL:2000 (0.7) PEG:2000 (0.3) | IPDI (3.5) | H₁₂DAM (1.25) HH (1.25) |
| Example 12 | PCL:2000 (0.7) PEG:1000 (0.3) | IPDI (3.5) | H₁₂DAM (1.25) HH (1.25) |
| Example 13 | PCL:2000 (0.7) PEG:700 (0.3) | IPDI (3.5) | H₁₂DAM (1.25) HH (1.25) |
| Comparative Example 10 | PCL:2000 (0.7) PEG:400 (0.3) | IPDI (3.5) | H₁₂DAM (1.25) HH (1.25) |

TABLE 8

| Example No. | Dye content of dry film (mg/g) | Fade-Ometer test | | Fastness to dry cleaning (grade) | Dye migration (grade) |
|---|---|---|---|---|---|
| | | Retention of strength (%) | Dye fading (grade) | | |
| Example 11 | 250 | 102 | 5 | 5 | 5 |
| Example 12 | 140 | 100 | 4–5 | 4 | 4 |
| Example 13 | 95 | 95 | 4–5 | 3 | 3 |
| Comparative Example 10 | 48 | 60 | 2–3 | 1 | 1 |

EXAMPLE 14 AND COMPARATIVE EXAMPLE 11

A solution of Irgalan Yellow GRL (1:2 type metal complex dye) in DMF was added to each of the polyurethane solutions obtained in Example 6 and Comparative Example 6 in an amount of 20% by weight based on the polyurethane solids. These two colored polyurethane solutions were each cast onto a glass plate and dried to give a dry film approximately 40µ thick. The dry films were subjected to various physical tests and the results are summarized in Table 9.

TABLE 9

| Example No. | Polyurethane solution used | Fade-Ometer test Retention of strength (%) | Dye fading (grade) | Fastness to dry cleaning (grade) | Dye migration (grade) |
|---|---|---|---|---|---|
| Example 14 | Obtained in Example 6 | 96 | 4–5 | 4–5 | 4–5 |
| Comparative Example 11 | Obtained in Comparative Example 6 | 50 | 2 | 1 | 1 |

EXAMPLE 15 AND COMPARATIVE EXAMPLE 12

A solution of Irgalan Yellow GRL in DMF was added to each of the solutions obtained in Example 12 and Comparative Example 10 in an amount of 20% by weight based on the polyurethane solids. These two colored polyurethane solutions were each cast onto a glass plate and dried to give a dry film approximately 40μ thick. The dry films were subjected to various physical tests and the results are summarized in Table 10.

TABLE 10

| Example No. | Polyurethane solution used | Fade-Ometer test Retention of strength (%) | Dye fading (grade) | Fastness to dry cleaning (grade) | Dye migration (grade) |
|---|---|---|---|---|---|
| Example 15 | Obtained in Example 12 | 101 | 4–5 | 4 | 4 |
| Comparative Example 12 | Obtained in Comparative Example 10 | 62 | 2–3 | 1 | 1 |

EXAMPLE 16

A web of nylon unwoven fabric was impregnated with a solution consisting essentially of: 20% (by weight) polyurethane elastomer, 4% brown pigment, 72% DMF and 4% water. The polyurethane elastomer were formed from polybutylene adipate glycol, 1,4-butanediol and diphenylmethane-4,4'-diisocyanate and contained 4% by weight of isocyanate nitrogen based on the polyurethane. The impregnated web was then coated with the same solution to deposit 110 g/m² of solids. The unwoven fabric web was then poured into a coagulating bath at 40° C. consisting of 40% DMF and 60% water by weight and maintained for 30 minutes as it was. The web was removed from the coagulating bath, rinsed with water and dried to form a porous substrate.

A colored polyurethane solution consisting essentially of 7% polyurethane, 2.1% Irgalan Yellow GRL and 90.9% DMF by weight was prepared by adding a solution of Irgalan Brown GRL in DMF to the polyurethane solution in DMF prepared in Example 1, and the colored polyurethane solution was then applied on the aforementioned porous substrate to deposit 2.8 g/m² of solids and dried. The resulting sheet was embossed in order to impart a leather-like grain pattern. The resulting embossed sheet had depth in the shade and excellent light resistance and showed little dye fading so that it was very suitable for use as instep leather for shoes.

In the same manner, the polyurethane solutions prepared in Examples 5, 9 and 11 were used to manufacture embossed artificial leather sheets. The resulting sheets all had depth in the shade and excellent light resistance and showed little dye fading so that they were very excellent for use as artificial leather.

EXAMPLES 17–22 AND COMPARATIVE EXAMPLES 13 & 14

The polyurethane film obtained in Example 1 was dyed with various dyes given in Table 11 below and the dyed films were subjected to various physical tests. The results are summarized in Table 12. In each dyed film, the dye molecules were penetrated sufficiently within the polyurethane.

TABLE 11

| Example No. | Dye | Class of dye |
|---|---|---|
| Example 17 | Irgalan Brown 2RL | 1:2 Type metal complex dye |
| Example 18 | Kayakalan Gray BL | 1:2 Type metal complex dye |
| Example 19 | Irgalan Blue FBL | 1:2 Type metal complex dye |
| Example 20 | Mikethrene Blue 3G | Vat dye |
| Example 21 | Kayakusulphur FG | Sulfur dye |
| Example 22 | Solar Red S | Acid dye |
| Comparative Example 13 | Phodamine 6GCP | Basic dye |
| Comparative Example 14 | Benzo Brilliant Sky Blue 8GS | Direct dye |

The dyeing conditions in Examples 17 to 19 were the same as those employed in Example 1. The reducing and oxidizing agents used for dyeing were hydrosulfite and hydrogen peroxide, respectively, in Example 20, and were sodium hydrosulfide (NaSH) and hydrogen peroxide, respectively, in Example 21. In Example 22, a sulfuric acid-containing acidic dye bath was employed. The dyeing was carried out in Comparative Example 13 by treatment in a dye bath containing 20% owf of Na₂SO₄ and 3% owf of the dye at 80° C. for an hour and in Comparative Example 14 by treatment in a dye bath containing 3% owf of the dye at 80° C. for an hour.

TABLE 12

| Example No. | Fade-Ometer test Retention of strength (%) | Dye fading (grade) | Fastness to dry cleaning (grade) | Dye migration (grade) |
|---|---|---|---|---|
| Example 17 | 95 | 5 | 5 | 5 |
| Example 18 | 98 | 5 | 5 | 5 |
| Example 19 | 93 | 5 | 5 | 5 |
| Example 20 | 79 | 4 | 4–5 | 4–5 |
| Example 21 | 75 | 4 | 4–5 | 4–5 |
| Example 22 | 73 | 4 | 4 | 4 |
| Comparative Example 13 | 51 | 2 | 2 | 3 |
| Comparative Example 14 | 53 | 2 | 3 | 3 |

What is claimed is:

1. A polyurethane composition comprising a polyurethane formed from (a) a polymeric diol having an average molecular weight in the range of 300 to 5,000, (b) an organic alicyclic diisocyanate, (c) hydrazine, (d) an organic alicyclic diamine, and (e) 3% to 70% by weight based on the weight of polyurethane of a dye selected from the group consisting of metal complex dyes, vat dyes, sulfur dyes and acid dyes, wherein said polyurethane satisfies the following requirements:

(I) the polymeric diol is either a diol containing a ($-CH_2CH_2O-$)$_n$ chain in its molecule or a mixture thereof with a polymeric diol free from ($-CH_2CH_2O-$)$_n$ chain where n is between 12 and 100 on the average and the amount of ($-CH_2CH_2O-$)$_n$ in the polymeric diol is in the range of 5 to 50% by weight;

(II) the molar ratio of organic diisocyanate to polymeric diol is in the range of 2.2 to 5.0; and (III) the molar ratio of hydrazine to the total amount of hydrazine and organic alicyclic diamine is in the range of 0.05 to 0.8.

2. The polyurethane composition of claim 1 wherein the polymeric diol is a mixed diol consisting of either a polyester glycol and poly(ethylene ether) glycol, or a polycarbonate glycol and poly(ethylene ether) glycol, said poly(ethylene ether) glycol having an average degree of polymerization in the range of 12 to 100, and the amount of polyoxyethylene chain in the polymeric diol is in the range of 5 to 50% by weight.

3. The polyurethane composition of claim 1 wherein n is between 15 and 80.

4. The polyurethane composition of claim 1, 2 or 3 wherein the organic alicyclic diisocyanate is isophorone diisocyanate.

5. The polyurethane composition of claim 1, 2, or 3 wherein the molar ratio of organic diisocyanate to polymeric diol is in the range of 2.5 to 4.5.

6. The polyurethane composition of claim 1, 2 or 3 wherein the dye is a metal complex dye.

7. The polyurethane composition of claims 1, 2 or 3 wherein the organic alicyclic diamine is isophoronediamine.

* * * * *